No. 664,182. Patented Dec. 18, 1900.
B. P. SHEPHERD.
HOLDER FOR SHOE LACES.
(Application filed Feb. 19, 1900.)
(No Model.)
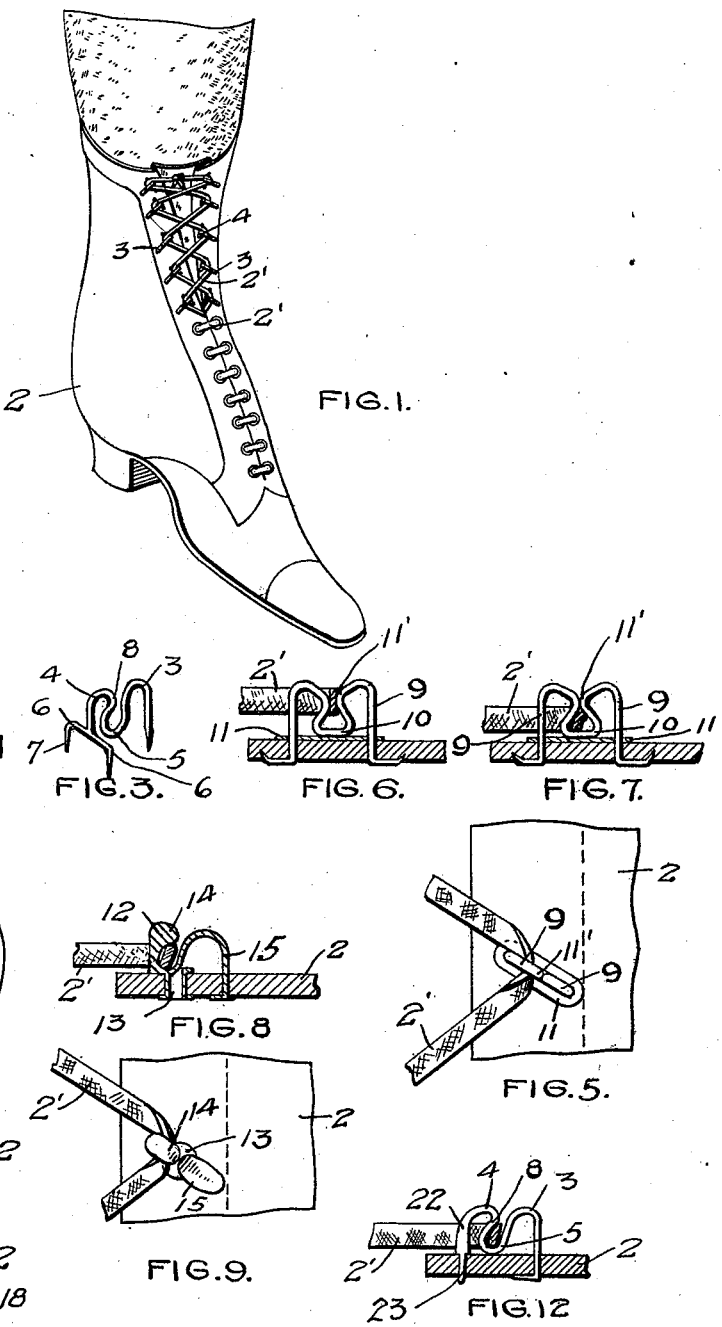
WITNESSES
INVENTOR
BURCHARD P. SHEPHERD
BY
HIS ATTORNEYS

UNITED STATES PATENT OFFICE.

BURCHARD P. SHEPHERD, OF WINONA, MINNESOTA.

HOLDER FOR SHOE-LACES.

SPECIFICATION forming part of Letters Patent No. 664,182, dated December 18, 1900.

Application filed February 19, 1900. Serial No. 5,700. (No model.)

*To all whom it may concern:*

Be it known that I, BURCHARD P. SHEPHERD, of Winona, county of Winona, State of Minnesota, have invented certain new and useful Improvements in Protected Hooks or Holders for Shoe-Laces, of which the following is a specification.

The invention relates to devices adapted particularly for holding the laces of ladies' shoes; and the objects of the invention are, first, to provide a shoe-lace-holding means which has no projecting corners or points to wear or catch the binding, ruffles, or lining of a lady's skirt; second, to provide means for holding the shoe-lace which will permit it to slide and adjust itself with respect to the holding device and shoe, and, third, to provide a very simple form of hook or holder easily attached to the shoe and neat and ornamental in appearance.

The invention consists generally in various constructions and combinations, all as hereinafter described, and particularly pointed out in the claims.

In the accompanying drawings, forming part of this specification, Figure 1 is a perspective of a lady's shoe with my improvement attached thereto. Fig. 2 is a view of the holder attached to a portion of the shoe. Fig. 3 shows the preferred form of lace-holder. Fig. 4 is a view showing the holder secured to the shoe and the lace in position therein. Fig. 5 is a view of a slightly-modified form of holder. Fig. 6 is a sectional view showing the lacing partially inserted into the holder. Fig. 7 is a similar view showing the lacing in position in the holder. Figs. 8 and 9 are detail views of a modified form of holder. Figs. 10 and 11 are details of another modification. Fig. 12 is a detail of still another modification.

In the drawings, 2 represents a lady's shoe having the usual rows of eyelets for the lacing-string 2' and near the top a series of holders wherein the lace is slipped and slidably held.

Various means have been devised for holding shoe-laces at the top of the shoe; but most of them are objectionable because of the projecting points or edges which wear or catch and tear the binding, lining, or ruffles of a lady's skirt, rendering the use of such a form of holder unsafe as well as inconvenient.

To obviate these difficulties and render the use of a lace-hook desirable upon ladies' shoes, I provide a protected or guarded holder, preferably of spring-wire, consisting of the shanks 3 and 4 and the inwardly-turned loop 5 between them, forming two hooks, one of which engages and holds the shoe-lace and the other acts as a guard to protect the first-named hook and prevent the skirt from catching thereon. The shank 3 has a sharp point which is clenched in the leather, and the end of the shank 4 is split to form arms 6, bent substantially at right angles to the shank 4 and adapted to rest upon the leather and hold the shank in place and having depending pointed ends 7, which are clenched on the inside of the shoe-upper. At the upper end of the loop 5, at the point where the shank 4 is turned in to form the hook and loop, I provide a shoulder 8, partially closing the open end or mouth of the loop, leaving sufficient space only for the lacing to slip in. When the lace has entered the loop, the opening will be contracted, preventing the lace from being accidentally unhooked, while permitting it to slide freely in the loop. These holders or hooks are preferably arranged on the shoe at an angle, so that the holder upon one side will be substantially at right angles to the succeeding and preceding holder upon the opposite side and the openings leading to the loops will be in position to permit the lacing to be conveniently slipped therein when the shoe is being laced up and as readily removed or pulled out when the shoe is being unlaced.

In Figs. 5, 6, and 7 I have shown another form of holder, also preferably of spring-wire, having shanks 9, whose ends are thrust through the leather and clenched on the inside, as shown in Figs. 6 and 7. Between the shanks 9 is an inwardly-turned loop 10, forming, with the shanks, two hooks, as described above, and bearing upon a plate 11, provided on the shanks 9, to prevent the loop from being pressed into the leather and disengaging the ends of the shanks. The open end of said flexible loop is preferably closed by shoulders 11', formed integrally therewith and with the shanks 9 and adapted to be separated by the lace when it is slipped into the loop. Owing to the spring character of the shanks and loop the shoulders 11', while normally in engagement with each other, as shown in Fig. 7, may be easily separated to permit the insertion of the shoe-lace. I prefer to employ the spring form of holder on account of its flexible nature, which permits the lacing to yield in walking, causing less strain on the lace and shoe and rendering the latter easier on the ankle and foot than a shoe having a rigid form of lace-holder.

In Figs. 8 and 9 I have shown a modified form of holder, which, if preferred, may be stamped out of a single piece of sheet metal or other suitable material. This holder comprises a post or hook 12, having an eyelet 13 clenched in the leather, and a head or enlarged upper end 14. The shoe-lace is passed around the hook 12, and an integral loop 15 is provided extending up opposite the head 14 and a sufficient distance therefrom to permit the lace to be slipped in between the loop and hook. The end of the loop is passed through the leather and clenched, and its rounded portion being opposite the hook acts as a guard therefor, preventing the hook from catching and tearing the skirt and the shoe-lace from being accidentally unhooked.

In Fig. 10 I have shown a modification, also preferably of sheet metal, wherein a stud or hook 17 is provided, having a head 18, an eyelet 19, and a looped spring portion 20, forming a guard for the hook. The spring is formed integrally with the hook, and its end projects into the eyelet and prevents the lacing from catching thereon. The middle portion of said spring yieldingly engages the head 19, thereby closing the opening leading to the space between the post 18 and the end of said spring, wherein the lacing is slidably held. The pressure of the lace upon the spring 20 will move it away from the head 19, permitting the lace to enter the space between them, and after the lace is inserted the spring will return to its normal position and prevent the accidental disengagement of the lace from the holder.

The construction shown in Fig. 11 is substantially the same as that described with reference to Fig. 10, except that the spring portion 21 is formed independently of the rest of the holder and is slipped on over the eyelet before it is secured to the shoe.

In Fig. 12 I have shown a slightly-modified form of wire holder, corresponding, substantially, to the holder shown in Figs. 2, 3, and 4, except that the hook 22 is made thicker and heavier and provided with a reduced end 23, that is thrust through the leather.

It will be noted in all the forms of holders herein shown and described that there are no projecting points or corners whereon a lady's garment could catch, and the holder in its preferred form being of flexible material will yield slightly to the strain of the lacing-string, causing less wear on the lacing and rendering the shoe much easier on the ankle and foot.

I am aware that in many ways the construction herein set forth may be modified by any one skilled in the art, and I therefore do not wish to be confined to the details shown and described.

While I have shown the device applied to a lady's shoe, it will be understood that it is equally applicable to a gentleman's shoe and may be used for other purposes where lacing-strings are employed, if desired.

Having thus described my invention, I claim as new and desire to secure by Letters Patent—

1. As a new article of manufacture, a shoe-lace holder, comprising shanks projecting out from the shoe and having ends adapted to be clenched therein, an inwardly-turned loop provided between said shanks and having an open outer end adapted to receive a shoe-lace, substantially as described.

2. As a new article of manufacture, a shoe-lace holder, comprising shanks having their ends secured to the shoe, an inwardly-turned loop having its closed end bearing upon the surface of the shoe and its open end in a plane substantially at right angles thereto, and yielding means provided at the open end of said loop permitting the insertion of a lacing and preventing its accidental disengagement, substantially as described.

3. As a new article of manufacture, a shoe-lace holder, composed of a single piece of spring-wire, comprising shanks having their ends secured to the shoe, an inwardly-turned loop provided between said shanks and supported thereby said loop having an open end or mouth adapted to receive a shoe-lace and said opening being of less diameter than the thickness of said lace whereby the accidental disengagement of the lace from said loop is prevented, substantially as described.

4. The combination, with a shoe of a lace-holder, composed of spring-wire, comprising shanks 3 and 4 having their ends secured to the shoe, an inwardly-turned loop 5 provided between said shanks, and wherein the shoe-lace is adapted to slide, said loop having an open outer end or mouth through which the lace is inserted into the loop, and a shoulder provided at the open end of said loop and preventing the accidental disengagement of the lace therefrom, substantially as described.

5. As a new article of manufacture, a shoe-lace holder, comprising a substantially straight post or stud adapted to be secured perpendicularly to the surface of the shoe, a guard or shield similarly secured opposite and near said post or stud, a space being provided between said guard and post to receive a shoe-lace, substantially as described.

6. As a new article of manufacture, a shoe-lace holder, comprising a substantially straight post or stud adapted to be secured perpendicularly with respect to the surface of the shoe, and a yielding guard or shield provided opposite and near said post and supported in a similar manner with respect to the shoe and between which and said post a space is provided to receive a shoe-lace.

7. As a new article of manufacture, a shoe-lace holder, comprising a hook around which the shoe-lace is passed, said hook being secured substantially at right angles to the surface of the shoe and projecting outwardly therefrom, and a guard or shield provided near said hook and having its outer end substantially flush with the outer end of said hook, substantially as described.

In testimony whereof I have hereunto set my hand this 13th day of February, 1900.

BURCHARD P. SHEPHERD.

In presence of—
RICHARD PAUL,
M. C. NOONAN.